United States Patent Office 3,828,036
Patented Aug. 6, 1974

3,828,036
BIS-QUATERNARY CYCLIC THIAZINES
Patrick M. Quinlan, Webster Groves, Mo., assignor to Petrolite Corporation, Wilmington, Del.
No Drawing. Filed Feb. 26, 1971, Ser. No. 119,384
Int. Cl. C07d 93/10
U.S. Cl. 260—243 B     5 Claims

ABSTRACT OF THE DISCLOSURE

Bis-quaternary cyclic thiazines as illustrated by the formula

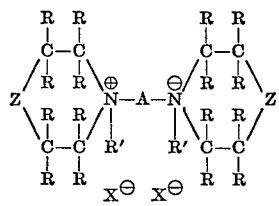

where the R's are hydrogen or a substituted group such as a hydrocarbon group, i.e., alkyl, etc., and Z is S, S→O, O←S→O and X is an anion.

These compositions may be linear such as where A is alkylene, alkenylene, alkynylene, arylene, alkarylenealkyl, oxyalkylene, for example as $-(CH_2)_n-$ or branched alkylene,

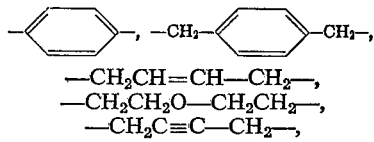

$-CH_2CH=CH-CH_2-$,
$-CH_2CH_2O-CH_2CH_2-$,
$-CH_2C\equiv C-CH_2-$, polyalkylene oxide such as $-A-(OA)_n-$ for example where A is alkylene derived from ethylene, propylene, butylene, etc., oxides $-CH_2CH_2(O-CH_2CH_2)_n-$, etc., and R' is alkyl, hydroxyalkyl, aryl, cycloalkyl, aralkyl, etc.

In addition, both A and R''s may be part of a cyclic structure, for example

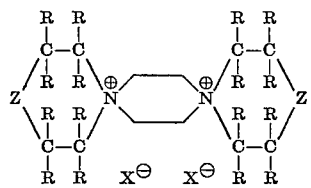

These compositions are prepared by reacting 1 mole of a di-secondary amine salt with 2 moles of a divinyl sulfur compound.

The products have a wide variety of uses including their use as microbiocides, etc.

---

This invention relates to diquaternary salts of bis-cyclic thiazines as illustrated by the formula

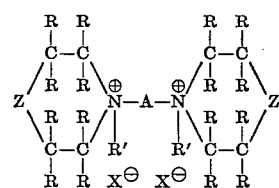

where the R's are hydrogen or a substituted group, such as a hydrocarbon group, i.e., alkyl, etc., and Z is S, S→O, O←S→O and X is an anion.

These compositions may be linear such as where A is alkylene, alkenylene, alkynylene, arylene, alkarylenealkyl, oxyalkylene, for example as $-(CH_2)_n-$ or branched alkylene,

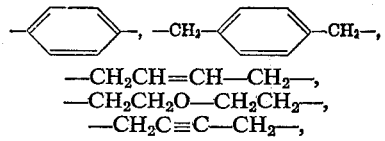

$-CH_2CH=CH-CH_2-$,
$-CH_2CH_2O-CH_2CH_2-$,
$-CH_2C\equiv C-CH_2-$, polyalkylene oxide such as $-A-(OA)_n-$ for example where A is alkylene derived from ethylene, propylene, butylene, etc., oxides $-CH_2CH_2(O-CH_2CH_2)_n-$, etc., and R' is alkyl, hydroxyalkyl, aryl, cycloalkyl, aralkyl, etc.

In addition both A and the R''s may be part of a cyclic structure, for example

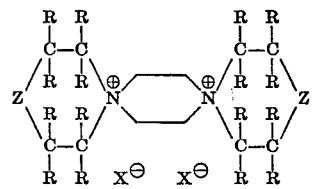

These compositions are prepared by reacting 1 mole of a di-secondary amine salt with 2 moles of a divinyl sulfur compound.

The products have a wide variety of uses including their use as microbiocides, etc.

For example, thiazine dioxide bis-quaternary ammonium salts may be prepared by the following reaction in which 1 mole of a di-secondary amine di-acid salt is reacted with 2 moles of divinyl sulfone.

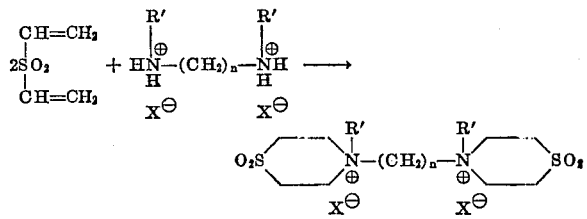

In addition, a di-secondary cyclic amine di-acid salt, such as piperazine dihydrohalide, may be reacted in a similar manner.

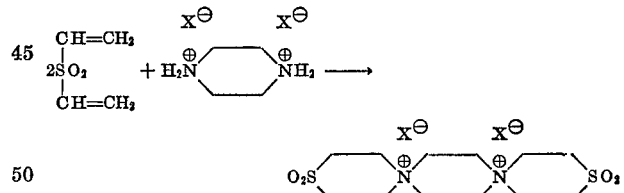

where X is an anion.

Among the di-secondary amines that may be employed are the following:

Piperazine, substituted piperazines and N,N'-disubstituted diamines such as N,N'-dialkyl, hydroxyalkyl, mixed alkyl, hydroxyalkyl, alkylene or phenylene diamines, etc.

N,N'-diethyl ethylenediamine
N,N'-dihydroxyethyl ethylenediamine
N,N'-dibutyl propylenediamine
N,N'-dihydroxypropyl hexamethylenediamine
N,N'-diethyl phenylenediamine
N,N'-dihydroxyethyl phenylenediamine Examples of the divinyl sulfur compounds are:

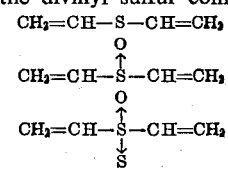

Suitable acids that may be employed to form the amine salts include hydrohalic acids such as hydrochloric, hydrobromic, hydroiodic, etc.; sulfuric, phosphoric, nitric, perchloric, hydrocarbon sulfonic acids such as methanesulfonic, ethyl sulfonic, benzyl sulfonic, and the like.

In carrying out the reaction it is preferred to form the amine salt in situ, that is in a solvent such as ethanol in which it is soluble. However, if desired, the salt may first be isolated and purified. To the solution of the amine salt in a suitable inert solvent is added the divinyl sulfone. The preferred temperature is about 20° to 50° C. though higher or lower temperatures may be employed. A catalyst such as triethylamine may be used. In most instances the thiazine dioxide quaternary nitrogen salt precipitates from the alcoholic medium and is purified by recrystallization. In some cases it is necessary to reduce the final volume in order to isolate the desired product.

The following examples are presented for purposes of illustration and not of limitation.

EXAMPLE 1

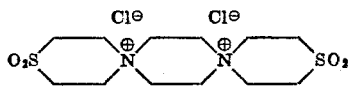

Divinyl sulfone 11.8 g. (0.1 mole) was slowly added to a solution of 4.3 g. (0.05 mole) of piperazine in 50 ml. of ethanol that had been acidified with 4.2 ml. of concentrated hydrochloric acid. The solution became very warm and a sticky solid precipitated from solution. The solid was added to a large volume of methanol, stirred, filtered and washed with alcohol.

The yield was 10.1 g. (50% of theory) of a colorless solid.

Analysis.—Calculated for $C_{12}H_{24}Cl_2N_2S_2O_4$: Cl, 17.97; N, 7.09; S, 16.2 Found: Cl, 17.3; N, 7.01; S, 16.6.

EXAMPLE 2

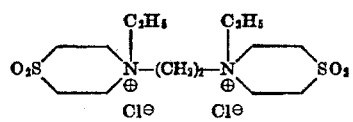

Divinyl sulfone 11.8 g. (0.1 mole) was slowly added to a solution of 5.8 g. (0.05 mole) of N,N¹-diethylethylenediamine in 25 ml. of 4N ethanolic hydrochloric acid. The reaction mixture became warm and a crystalline solid precipitated from solution. It was recrystallized from aqueous ethanol; yield 10.1 g. (50% of theory).

Analysis.—Calculated for $C_{14}H_{30}Cl_2N_2S_2O_4$: Cl, 16.7; N, 6.59; S, 15.1. Found: Cl, 16.5; N, 6.54; S, 15.3

EXAMPLE 3

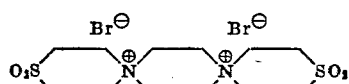

Divinyl sulfone 11.8 g. (0.1 mole) was slowly added to a solution of 4.3 g. (0.05 mole) of piperazine that had been acidified with 5.4 ml. of concentrated hydrobromic acid. The solution became quite warm and a sticky solid precipitated. The solid was filtered, washed with methanol and dried.

The following examples, similarly prepared, are presented in the following Table A.

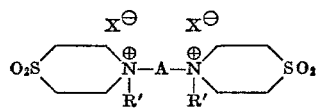

TABLE A

| Example | A | R' | X |
|---|---|---|---|
| 4 | $-(CH_2)_2-$ | $-C_2H_4OH$ | Cl |
| 5 | $-(CH_2)_3-$ | $C_2H_5-$ | Cl |
| 6 | $-C_6H_4-$ | $C_2H_5-$ | Cl |
| 7 | $-H_2C-C_6H_4-CH_2-$ | $CH_3-$ | Br |
| 8 | $-(CH_2)_6-$ | $C_4H_9-$ | Br |
| 9 | $-C_6H_4-$ | $-C_2H_4OH$ | I |
| 10 | $-CH_2-CH=CH-CH_2$ | $C_2H_5-$ | Br |
| 11 | $-(CH_2)_2-$ | $C_6H_5-CH_2-$ | Cl |
| 12 | $-(C_2H_4O)_3-C_3H_6-$ | $C_2H_5-$ | Cl |
| 13 | $-(CH_2)_2-$ | $C_6H_5-$ | Br |
| 14 | $-(CH_2)_2-$ | cyclopentyl | I |
| 15 | $-(CH_2)_3-$ | $C_2H_5-$ | $NO_3$ |
| 16 | $-(CH_2)_2-$ | $C_{12}H_{25}-$ | Cl |
| 17 | $-(CH_2)_4-$ | $C_{18}H_{37}-$ | Cl |

As is quite evident, other secondary diamines and divinyl sulfur compounds will be constantly developed which could be useful in this invention. It is, therefore, not only impossible to attempt a comprehensive catalogue of such compounds, but to attempt to describe the invention in its broader aspects in terms of other specific compounds used would be too voluminous and unnecessary since one skilled in the art could by following the description of the invention herein select useful secondary diamines and divinyl sulfur compounds. To precisely define each specific useful secondary diamine and divinyl sulfur compound in light of the present disclosure would merely call for chemical knowledge within the skill of the art in a manner analogous to a mechanical engineer who prescribes in the construction of a machine the proper materials and the proper dimensions thereof. From the description in this specification and with the knowledge of a chemist, one will know or deduce with confidence the applicability of specific compounds suitable for this invention by applying them in the invention set forth herein. In analogy to the case of a machine, wherein the use of certain materials of construction or dimensions of parts would lead to no practical useful result, various materials will be rejected as inapplicable where others would be operative. I can obviously assume that no one will wish to employ a useless compound nor will be misled because it is possible to misapply the teachings of the present disclosure to do so.

USE AS A MICROBIOCIDE

(I) In water treatment

This phase of the present invention relates to the treatment of water. More particularly, it is directed to providing improved means for controlling microbiological organisms including bacteria, fungi, algae, protozoa, and the like, present in water.

It is well known that ordinary water contains various bacteria, fungi, algae, protozoa and other microbiological organisms which, if uncontrolled, multiply under certain conditions so as to present many serious problems. For example, in swimming pools the growth of these microbiological organisms is very undesirable from a sanitary standpoint as well as for general appearances and maintenance. In industrial water systems such as cooling towers, condenser boxes, spray condensers, water tanks, basins, gravel water filters, and the like, microbiological organisms may interfere greatly with proper functioning of equipment and result in poor heat transfer, clogging of systems and rotting of wooden equipment, as well as many other costly and deleterious effects.

In other industrial applications where water is used in processes, as for example, as a carrying medium, etc., microbiological organisms may also constitute a problem in maintenance and operation. Illustrative of such industrial applications are the pulp and paper manufacturing processes, oil well flooding operations and the like.

The products of this invention are suitable as biocides for industrial, agricultural and horticultural, military, hygenic and recreational water supplies. They provide an inexpensive, easily prepared group of products which can be used, in minimal amounts, in water supplies, in cooling towers, air-conditioning systems, on the farm and ranch, in the factory, in civilian and military hospitals and dispensaries, in camps, for swimming pools, baths and aquaria, waterworks, wells, reservoirs, by fire-fighting agencies, on maritime and naval vessels, in boilers, steam-generators and locomotives, in pulp and paper mills, for irrigation and drainage, for sewage and waste disposal, in the textile industry, in the chemical industries, in the tanning industry, et cetera, and which will render said water supplies bactericidal, fungicidal and algicidal. They further provide a simple process whereby water supplies, for whatever purposes intended, are rendered bacteriostatic, fungistatic and algistatic, i.e., said water supplies treated by the process of this invention will resist and inhibit the further growth or proliferation of bacteria, fungi, algae and all forms of microbial life therein.

(II) Water flooding in secondary recovery of oil

This phase of the present invention relates to secondary recovery of oil by water flooding operations and is more particularly concerned with an improved process for treating flood water and oil recovery therewith. More particularly this invention relates to a process of inhibiting bacterial growth in the recovery of oil from oil-bearing strata by means of water flooding taking place in the presence of sulfate-reducing bacteria.

Water flooding is widely used in the petroleum industry to effect secondary recovery of oil. By employing this process the yield of oil from a given field may be increased beyond the 20–30 percent of the oil in a producing formation that is usually recovered in the primary process. In flooding operations, water is forced under pressure through injection wells into or under oil-bearing formations to displace the oil therefrom to adjacent producing wells. The oil-water mixture is usually pumped from the producing wells into a receiving tank where the water, separated from the oil, is siphoned off, and the oil then transferred to storage tanks. It is desirable in carrying out this process to maintain a high rate of water injection with a minimum expenditure of energy. Any impediment to the free entry of water into oil bearing formations seriously reduces the efficiency of the recovery operation.

The term "flood water" as herein employed is any water injected into oil-bearing formations for the secondary recovery of oil. In conventional operations, the water employed varies from relatively pure spring water to brine and is inclusive of water reclaimed from secondary recovery operations and processed for recycling. The problems arising from the water employed depend in part on the water used. However, particularly troublesome and common to all types of water are problems directly or indirectly concerned with the presence of microorganisms, such as bacteria, fungi and algae. Microorganisms may impede the free entry of water into oil-bearing formations by producing ions susceptible of forming precipitates, forming slime and/or existing in sufficiently high numbers to constitute an appreciable mass, thereby plugging the pores of the oil-bearing formation. Pore-plugging increases the pressure necessary to drive a given volume of water into an oil-bearing formation and oftentimes causes the flooding water to by-pass the formation to be flooded. In addition, microorganisms may bring about corrosion by acting on the metal structures of the wells involved, producing corrosive substances such as hydrogen sulfide, or producing conditions favorable to destructive corrosion such as decreasing the pH or producing oxygen. The products formed as the result of corrosive action may also be pore-plugging precipitates. Usually, the difficulties encountered are a combination of effects resulting from the activity of different microorganisms.

Organisms of the Desulfovibrio genus, more commonly known as sulfate reducing bacteria, are known particularly to preclude efficient operation of oil recovery by conventional water flooding techniques by producing $H_2S$ which reacts with iron or iron salts to precipitate black ferrous sulfide. These organisms are often resistant to the effects of many known antimicrobial compounds.

I have discovered that the compositions of this invention are effective bactericides for sulfate reducing bacteria.

(III) Hydrocarbon treatment

This phase of the present invention relates to the use of these compounds as biocides in hydrocarbon systems.

In addition to being used as biocides in aqueous systems, the compounds of this invention can also be employed as biocides in hydrocarbon systems, particularly when petroleum products are stored. It is believed that bacteria and other organisms, which are introduced into hydrocarbon systems by water, feed readily on hydrocarbons resulting in a loss in product; that microorganisms cause the formation of gums, $H_2S$, peroxides, acids and slimes at the interface between water and oil; that bacterial action is often more pronounced with rolling motion than under static conditions, etc. Loss of product, corrosion of the storage tank, clogging of filters and metering instruments, and fuel deterioration are among the harmful effects of bacteria growth in fuels. The activity of microorganism growth is often increased by the presence of rust. Not only do these microorganisms often encourage rust but rust encourages microorganism growth. Since microorganism growth appears to be considerably higher with kerosene than with gasoline, plugged filters experienced with jet fuels which contain large amounts of kerosene is a serious problem.

The compositions of this invention can be employed in hydrocarbon systems.

Microbial Testing: The screening procedure was as follows: a one percent by weight solution of the test compound in water was prepared. The solution was aseptically added to a sterile broth that would support the growth of the test organism, *Desulfovibrio desulfuricans*, to provide a concentration of 50 and 100 parts by weight of test compound per million parts by weight of broth. A general growth medium, such as prescribed by the American Petroleum Institute was used. The broth containing the test compound then was dispersed in 5 cc. amounts into sterile disposable tubes and the tubes were inoculated with the growing test organism and incubated at 35° C. for 24 hours. The absence or presence of growth of the microorganisms was determined by visual inspection by an experienced observer.

Following is a summary of the results of the testing of examples of this invention.

Compound Example No.:     Concentration of Test Compound
1 ---------------------------------------- 50
2 ---------------------------------------- 50
3 ---------------------------------------- 50

In all of the above tests no growth of the test organism occurred, thus indicating that the compound is a biostatic or a biocide.

I claim:
1. A compound of the formula

(I) 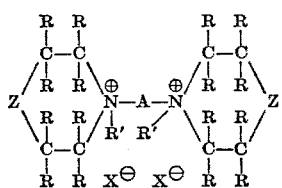

(II) 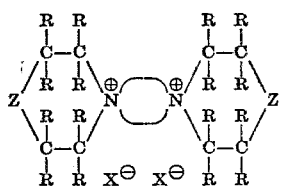

where the R's are hydrogen, alkyl, alkenyl, alkynyl, aryl and aralkyl, Z is S, S→O or O←S→O, A is alkylene, alkenylene, alkynylene, arylene, alkarylenealkyl or oxyalkylene, R' is alkyl, hydroxyalkyl, aryl, cycloalkyl or aralkyl,

is A in combination with the R's forming a cyclic polymethylene structure and X is halide, sulfate, phosphate, nitrate, perchlorate or alkyl, alkenyl, alkynyl, aryl and aralkyl sulfonate, wherein the above noted R's, A, R' and X are of 1 to 18 carbon atoms and the said arylene, aryl, and ara- are carbocyclic.

2. The compound of Claim 1 of the formula II where

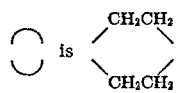

the R's are hydrogen and Z is O←S→O, said compound being of the formula

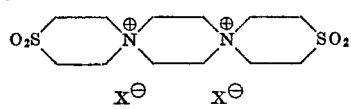

3. The compound of Claim 1 of the formula I where A is alkylene, alkenylene, alkynylene, arylene, alkarylenealkyl or oxyalkyl, the R's are hydrogen, R' is alkyl and Z is O←S→O. said compound being of the formula

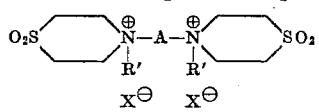

4. The compound of Claim 1 of the formula where the R's are hydrogen, the R''s are alkyl, A is alkylene, Z is O←S→O and

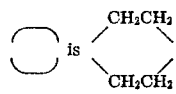

I being of the formula

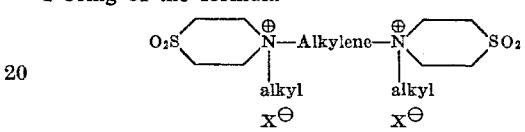

and II being of the formula

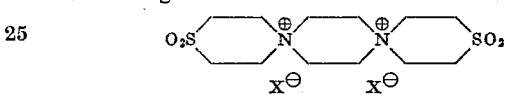

5. The compound of Claim 1 where A is $-(CH_2)_2-$, $-(CH_2)_3-$, $$-\langle\bigcirc\rangle-, \quad -H_2C-\langle\bigcirc\rangle-CH_2-,$$

$-(CH_2)_6-$, $-CH_2CH=CH-CH_2-$, $-CH_2CH_2-O-CH_2CH_2-$, $-(C_3H_6O)_3C_3H_6-$ or $-CH_2C\equiv C-CH_2-$ and R' is $-C_2H_5$, $-C_2H_4OH$, $-CH_3$, $-C_4H_9$, $-C_3H_6OH$, $$-CH_2-\langle\bigcirc\rangle, \quad -\langle\bigcirc\rangle, \quad -\langle\bigcirc\ |,$$

$-C_{12}H_{25}$ or $-C_{18}H_{37}$ and

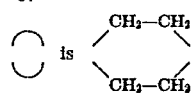

References Cited
UNITED STATES PATENTS 2,675,381   4/1954   Craig et al. _____ 260—246 X
3,481,941   12/1969   Mizzoni _____ 260—243 X
3,635,962   1/1972   Wyss _____ 260—246 X JOHN M. FORD, Primary Examiner U.S. Cl. X.R.

260—243 B; 424—246